United States Patent [19]

Gurney

[11] Patent Number: 4,512,210
[45] Date of Patent: Apr. 23, 1985

[54] PARKING BRAKE LEVER ASSEMBLY
[75] Inventor: Anthony R. Gurney, Toledo, Ohio
[73] Assignee: Donovan Wire & Iron, Toledo, Ohio
[21] Appl. No.: 431,591
[22] Filed: Sep. 30, 1982
[51] Int. Cl.³ .............................................. G05G 5/06
[52] U.S. Cl. ...................................... 74/535; 74/538; 74/501.5 R
[58] Field of Search ...................... 74/501.5, 535, 536, 74/537, 538; 192/111 A

[56] References Cited
U.S. PATENT DOCUMENTS

| | | | |
|---|---|---|---|
| 2,099,233 | 11/1937 | Sandberg | 74/537 |
| 3,109,320 | 11/1963 | Krautwurst | 74/537 |
| 3,187,595 | 6/1965 | Clark | 74/538 |
| 3,602,064 | 8/1971 | Francis | 74/501.5 R |
| 4,381,053 | 4/1983 | Hyodo | 192/111 A |

FOREIGN PATENT DOCUMENTS 660870  5/1979  U.S.S.R. .................. 74/535

Primary Examiner—Kenneth J. Dorner
Attorney, Agent, or Firm—Vincent L. Barker, Jr.; Mark J. Sobanski; Richard S. MacMillan

[57] ABSTRACT

The present invention relates to a lever assembly which is coupled by a cable to operate a remote mechanism, such as a vehicle parking brake. The lever assembly comprises a lever pivotally mounted to a support member. A locking pawl pivotally mounted to the lever is adapted to engage one of a plurality of ratchet teeth on the support member for maintaining the lever in a selected pivoted position relative to the support member. The one end of the cable is coupled to the handle such that pivoting of the lever results in movement of the cable and operation of the remote mechanism. In accordance with the present invention, an adjusting device is provided for maintaining the cable within a predetermined tension range when the lever is in the non-operating position.

6 Claims, 5 Drawing Figures

PARKING BRAKE LEVER ASSEMBLY

BACKGROUND OF THE INVENTION

The present invention relates in general to a lever assembly coupled by a cable assembly to operate a remote mechanism and, in particular, to a lever assembly which is intended for use in motor vehicles.

Motor vehicles typically utilize either a hand-actuated or a foot-actuated lever assembly as one means for operating a parking brake mechanism. Such lever assemblies typically include an actuating lever which is coupled to one end of an actuating cable having an opposite end connected to actuate the parking brake. Generally, such a cable is provided with an adjustment device which is utilized to adjust the tension of the cable when the lever is in a non-operating position such that pivoting of the lever results in a sufficient increase in cable tension to operate the parking brake. Without such adjustment, the lever assemblies might not provide enough cable tension to actuate the brake. Typically, the cable tension adjustment for new vehicles is performed as an assembly line operation. However, such an adjustment operation can be relatively time consuming in comparison with other operations performed on the assembly line.

SUMMARY OF THE INVENTION

The present invention relates to a lever assembly which includes means for automatically adjusting the tension of the associated cable when the components of the lever assembly are in the non-operating position. The lever assembly generally comprises a lever pivotally mounted to a support member anchored to a portion of a vehicle frame. A locking pawl is pivotally mounted to the lever and is adapted to engage a first sector of ratchet teeth provided on the support member for maintaining the lever in a selected operating position. The lever includes means for disengaging the pawl from the ratchet teeth to enable the lever to return to a non-operating position.

In accordance with the present invention, the lever assembly includes means for automatically adjusting the cable tension when the lever is in the non-operating position. Such means includes an adjusting disc rotatably mounted about the pivot point common the the lever and the support member. The adjusting disc includes means for securing the one end of the cable to the periphery of the disc. A biasing spring is adapted to exert a rotational force on the adjusting disc relative to the lever such that the one end of the cable is wrapped around a portion of the adjusting disc to create a tension in the cable which tension is within a predetermined range determined by the characteristics of the biasing spring.

The lever assembly is provided with means for locking the adjusting disc to the lever when the lever is pivoted from the non-operating position. Such means includes a second sector of ratchet teeth formed around a portion of the periphery of the adjusting disc which teeth are adapted to engage an adjusting pawl pivotally mounted on the lever when the lever is pivoted from the non-operating position. In one embodiment of the invention, the adjusting pawl is disengaged from the ratchet teeth when the lever is returned to the non-operating position. In another embodiment, the adjusting pawl is maintained in engagement with the ratchet teeth and is selectively indexed along the ratchet teeth as the biasing spring causes the cable to remain within a predetermined tension range.

DESCRIPTION OF THE PREFERRED EMBODIMENT

Figure 1:
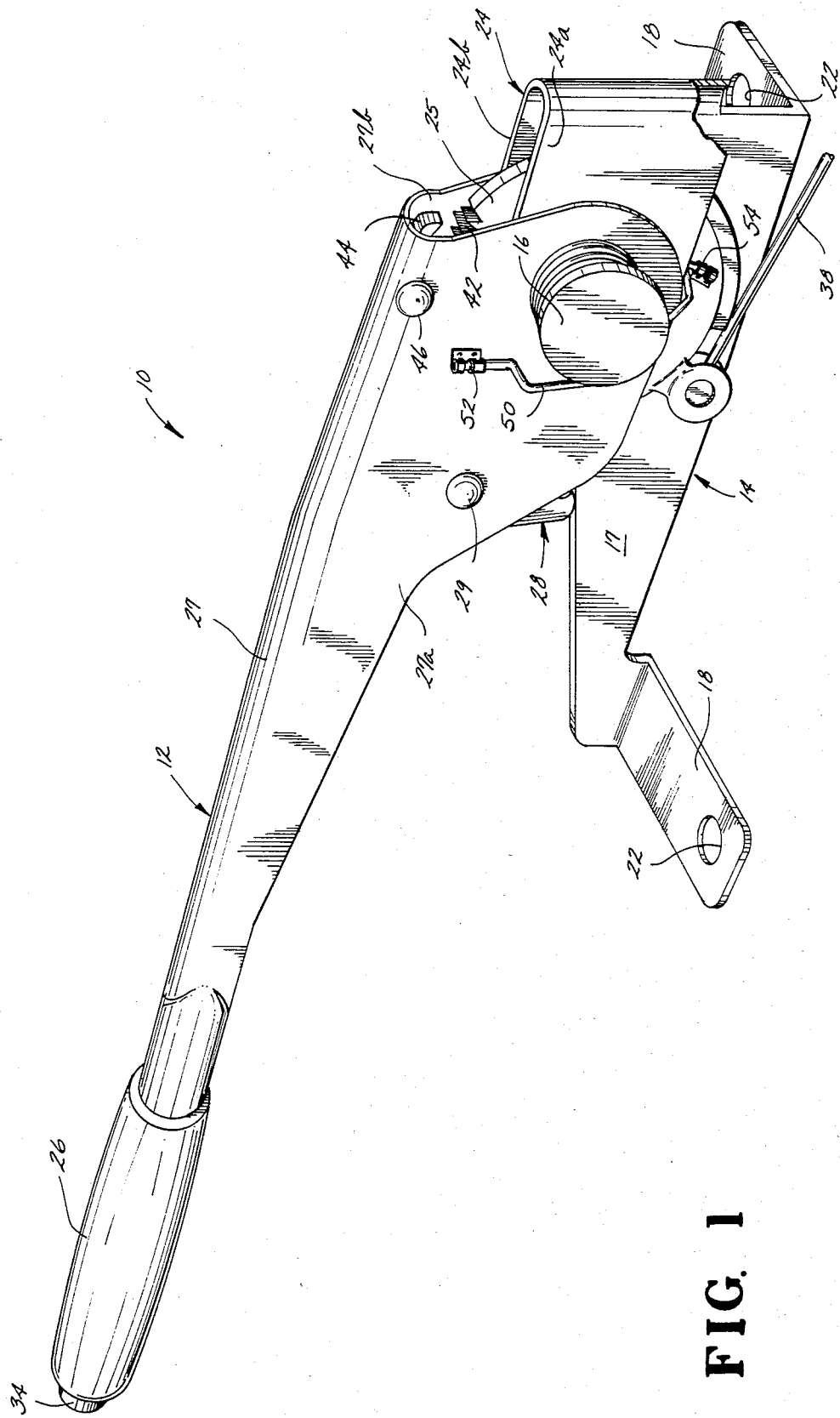
FIG. 1 is a perspective view of the lever assembly according to the present invention.

It should be noted at the outset of this description that, while the preferred embodiment of the invention is described and illustrated as a hand-actuated lever assembly, it will be readily apparent that the present invention can be incorporated in a lever assembly operated by other means such as a foot, for example.

Referring to the drawings, there is shown a lever assembly 10 according to the present invention. The lever assembly 10 generally comprises a lever 12 pivotally mounted to a support member 14 by a pivot pin 16. The support member 14 includes a generally vertical plate 17 having a pair of lower mounting flanges 18 mounted on the opposite sides thereof. Each flange 18 has an aperture 22 formed therein for receiving a suitable bolt (not shown) for securing the support member 14 to a portion of a vehicle frame (not shown).

The rear portion of the support member 14 is provided with a U-shaped channel section 24 having spaced apart sidewalls 24a and 24b. An adjusting disc 25 is adapted to be rotatably mounted between the spaced apart sidewalls of the channel section 24. The lever 12 includes a hand grip 26 connected to a bifurcated arm 27 having sidewalls 27a and 27b which are positioned on the outside the channel section 24. The pivot pin 16 extends through apertures (not shown) formed in the lever 12, the channel section 24, and the adjusting disc 25.

Figure 2:
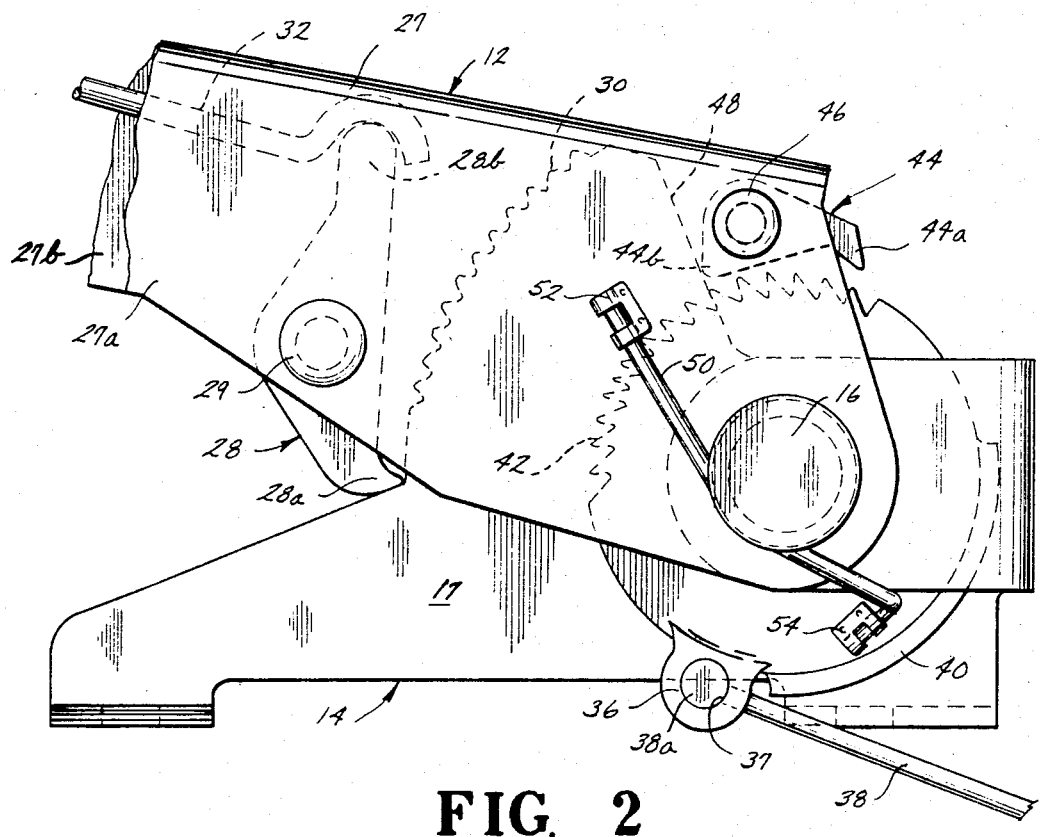
FIG. 2 is a side elevational view of the lever mechanism showing the lever in the non-operating position.
Figure 3:
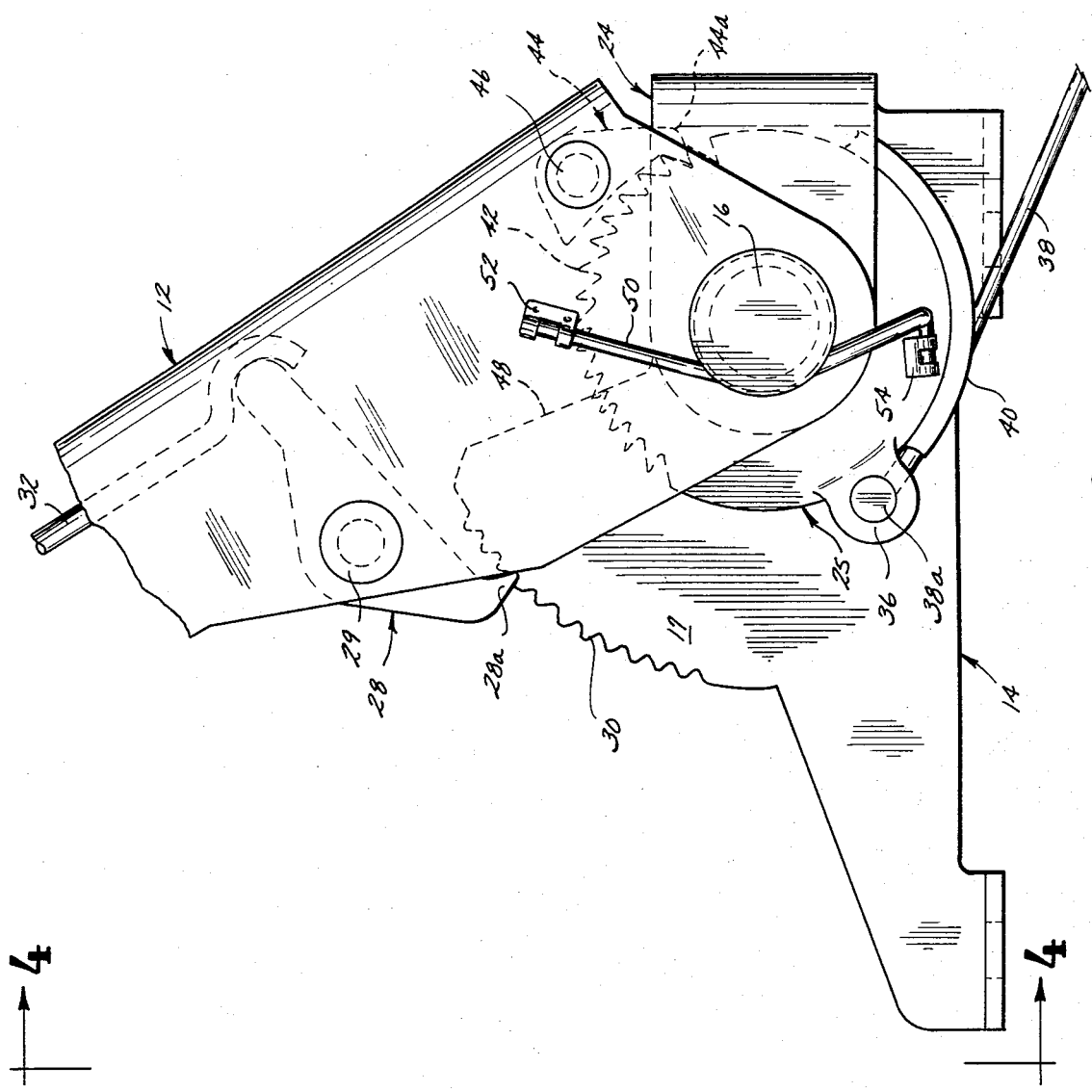
FIG. 3 is a side elevational view, similar to FIG. 2, but showing the lever after it has been pivoted to an operating position.
Figure 4:
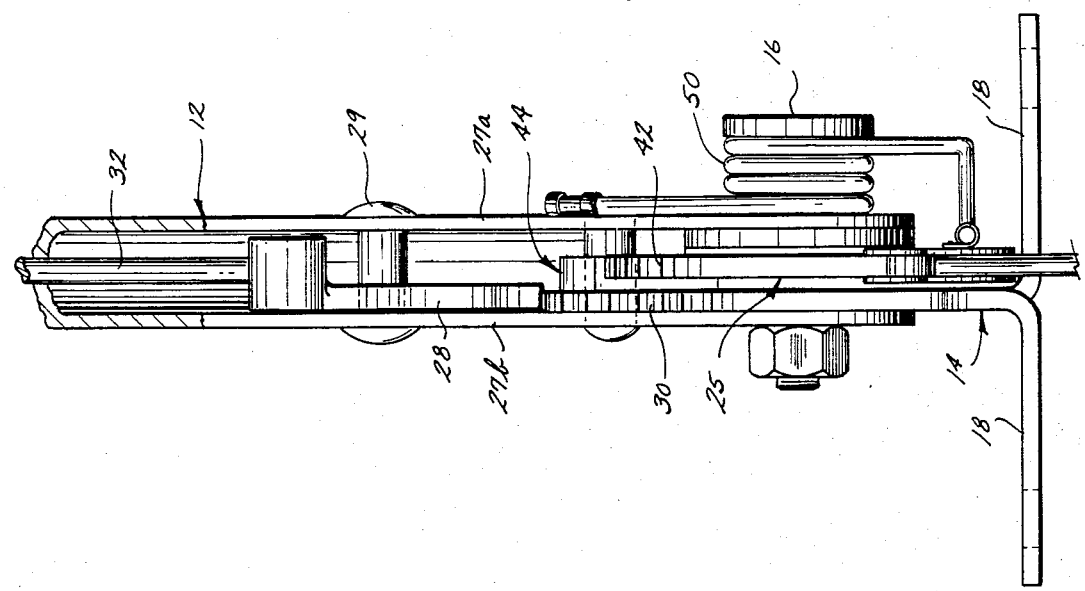
FIG. 4 is an end view taken along the line 4—4 of FIG. 3.

Referring to FIG. 2, a locking pawl 28 is pivotally mounted between the sidewalls 27a and 27b of the lever 12. The pawl 28 includes one end 28a which is adapted to engage a sector of ratchet teeth 30 formed along the upper periphery of the vertical plate 17. The pawl 28 includes an opposite end 28b which is coupled to an actuating arm 32 which extends between the sidewalls 27a and 27b of the lever arm 27. The outer end of the lever 12 is provided with a biasing means (not shown) which is coupled to bias the actuating arm 32 toward the outer end of lever 12, thus exerting a counterclockwise force on the pawl 28 (as viewed in FIGS. 2 and 3). When the lever 12 is pivoted upwardly, as shown in FIG. 3, the one end 28a of the pawl 28 will be urged into engagement with the ratchet teeth 30 and will maintain the lever 12 in the selected pivoted position. A release button 34 mounted on the extreme one end of the lever 12 is coupled to the actuating arm 32 and, when depressed, causes the pawl 28 to pivot and release the one end 28a from the ratchet teeth 30.

The adjusting disc 25 is provided with spaced apart radially extending flange portions 36 each provided with an aperture 37 for receiving an enlarged end 38a of a cable 38. The opposite end of the cable 38 is connected to actuate a remote mechanism (not shown) such as a vehicle parking brake, for example. The adjusting disc 25 is provided with a annular channel 40 extending circumferentially around a portion of the disc which, as will be discussed, is utilized to receive a portion of the cable 38 when the disc 25 and the lever 12 are simultaneously pivoted to actuate the remote mechanism.

The adjusting disc 25 is also provided with a second sector of ratchet teeth 42 which are adapted to engage an adjusting pawl 44 pivotally mounted between the sidewalls 27a and 27b of the lever arm 27 by means of a pivot pin 46. As shown in FIG. 2, the locking pawl 44 includes one end 44a adapted to engage the ratchet teeth 42 and a generally opposite end 44b adapted to engage an inclined surface 48 formed in the top of the vertical plate 17. As shown in FIG. 2, when the handle 12 is in the non-operating position, the surface 48 engages the opposite end 44b of the pawl 44 to lift the one end 44a away from the ratchet teeth 42.

A biasing spring 50 mounted about the pivot pin 16 has one end secured to the handle at 52 and has an opposite end secured to the adjusting disc 25 at 54. When the lever 12 is in the non-operating position, as shown in FIG. 2, the spring 50 exerts a clockwise force (as viewed in FIGS. 2 and 3) on the adjusting disc 25 which creates a predetermined tension in the cable 38. Such a tension is determined by the characteristics of the spring 50. While the force exerted on the disc 25 will vary as the relative position of the spring ends are changed due to the spring constant of the spring 50, the spring 50 can be selected to provide the desired tension range in the cable 38 over the expected operating range of the disc 25.

When the handle is pivoted upwardly, the end 44b of the pawl 44 is disengaged from the incline surface 48 to permit the one end 44a of the adjusting pawl 44 to engage the ratchet teeth 42. This causes the adjusting disc 25 to be locked to the lever 12 while the lever is pivoted to an operating position.

Figure 5:
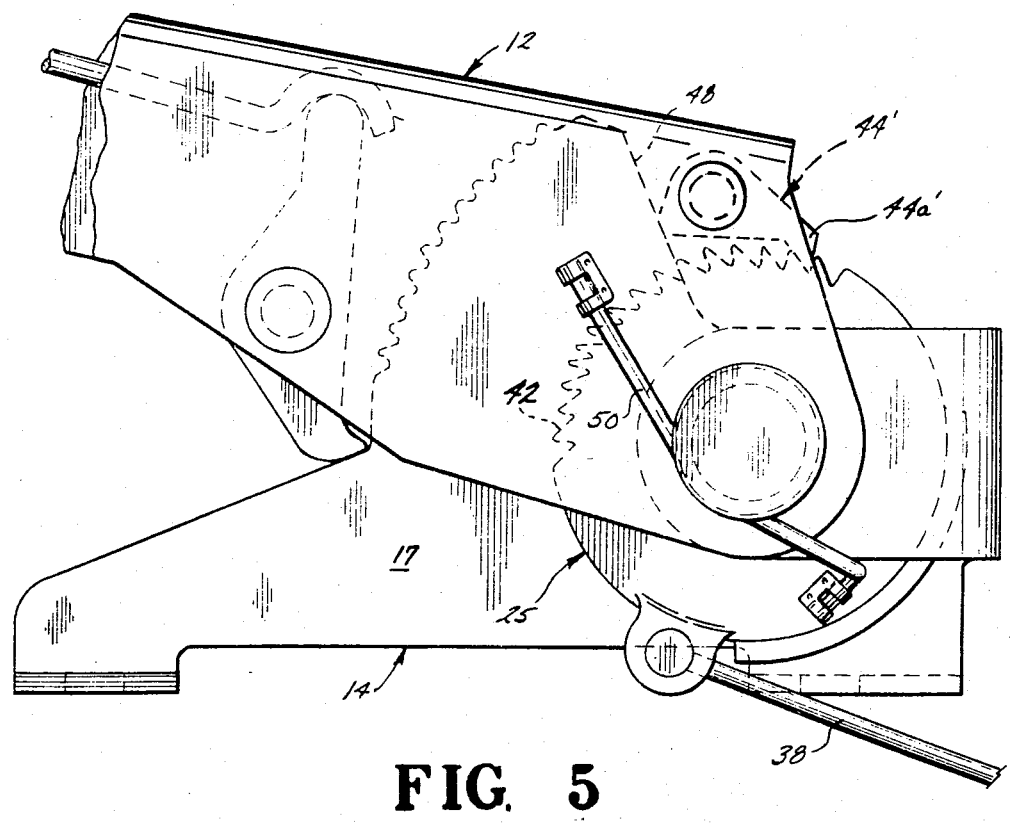
FIG. 5 is a side elevational view, similar to FIG. 2, but showing an alternate embodiment of the adjusting pawl wherein the pawl is maintained in constant engagement with the ratchet teeth of the adjusting disc.

FIG. 5 is a side elevational view, similar to FIG. 2, but showing an alternate embodiment of the lever assembly. This embodiment is identical to the assembly shown in FIG. 2 except for the design of the adjusting pawl 44. In the alternate embodiment of FIG. 5, an adjusting pawl 44' includes one end 44a adapted to engage the ratchet teeth 42. However, the opposite end of the paul is constructed such that it does not contact the inclined surface 48 of the vertical plate 17 when the lever 12 is in the non-operating position. Consequently, the adjusting pawl 44' remains engaged with the ratchet teeth 42. Thus, as the cable 38 wears and stretches, the spring 50 biases the adjusting disc 25 to index the pawl 44' along the ratchet teeth 42.

In accordance with the provisions of the patent statutes, the principal and mode of operation of the invention have been explained and illustrated in what is considered to represent its best embodiments. However, it must be understood that the invention can be practiced otherwise than as specifically illustrated and described without departing from its spirit or scope.

What is claimed is:

1. A lever assembly adapted to be connected to one end of a cable assembly having an opposite end connected to operate a remote mechanism, said lever assembly comprising:
   a support member;
   a lever pivotally mounted to said support member;
   locking means for maintaining said lever in a selected pivoted position relative to said support member; and
   adjusting means for maintaining the cable within a predetermined tension range when said lever is in a non-operating position, said adjusting means including an adjusting element pivotally mounted to said support member, said adjusting element including means for securing the one end of said cable assembly to said element, biasing means for exerting a predetermined rotational force on said element relative to said lever when said lever is in a non-operating position to cause the cable tension to fall within the predetermined range, and means for locking said adjusting element to said lever when said lever is pivoted to an operating position, said biasing means including a spring having one end coupled to said lever and an opposite end coupled to said adjusting element, and said means for locking said adjusting element including a sector of ratchet teeth on said adjusting element and an adjusting pawl pivotally mounted on said lever and adapted to engage one of said ratchet teeth when said lever is pivoted to an operating position.

2. A lever assembly according to claim 1 wherein said adjusting elements is provided with a channel extending along a portion of the periphery thereof for receiving the end portion of the cable assembly as said adjusting element is rotated relative to said support member.

3. A lever assembly according to claim 1 including means for disengaging said adjusting pawl from said ratchet teeth when said lever is in a non-operating position.

4. A lever assembly according to claim 3 wherein said means for disengaging includes a projection formed on said adjusting pawl, said projection adapted to engage said support member and pivot said adjusting pawl away from said ratchet teeth when said lever is in a non-operating position.

5. A lever assembly according to claim 1 including means for maintaining said adjusting pawl in constant engagement with said ratchet teeth.

6. A lever assembly according to claim 1 wherein said locking means includes a sector of ratchet teeth formed on said support member, a locking pawl pivotally mounted on said lever and engageable with one of said ratchet teeth on said support member when said lever is pivoted to an operating position, and means for disengaging said locking pawl from said ratchet tooth on said support member to enable said lever to return to a non-operating position.

* * * * *